Figure 1:
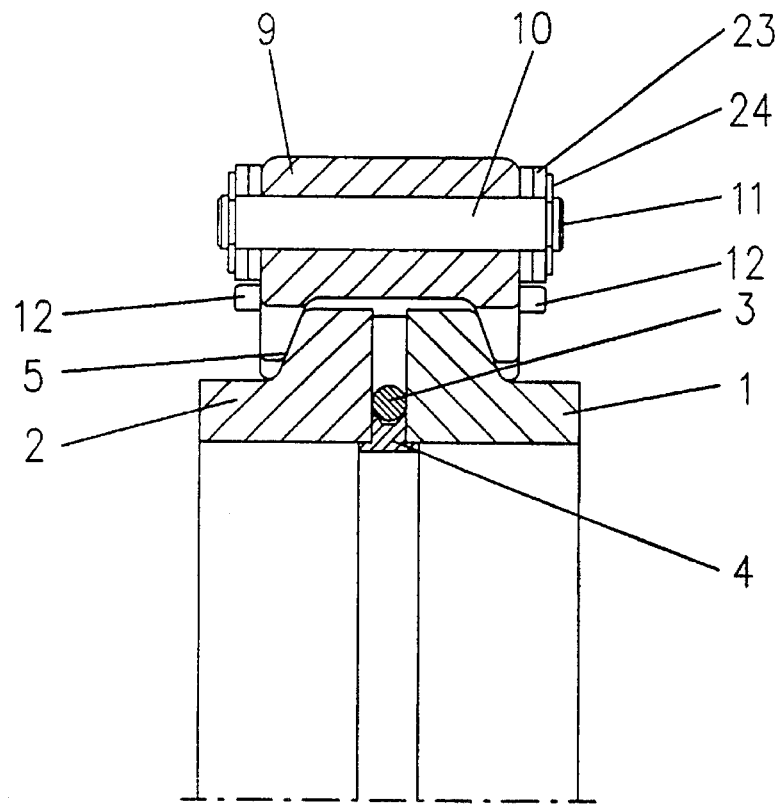

United States Patent
Fend

[11] Patent Number: 5,499,849
[45] Date of Patent: Mar. 19, 1996

[54] DEVICE FOR FORCING TWO CONICAL FLANGES OF A PIPE COUPLING TOGETHER UNDER PRESSURE

[76] Inventor: Heinrich Fend, Zehntenweg 4, CH-9470 Buchs, Switzerland

[21] Appl. No.: 64,268

[22] Filed: May 19, 1993

[30] Foreign Application Priority Data

May 21, 1992 [EP] European Pat. Off. ............ 92810384

[51] Int. Cl.⁶ .................................................. F16L 23/08
[52] U.S. Cl. ............................................ 285/367; 285/411
[58] Field of Search .................................... 285/411, 367

[56] References Cited

U.S. PATENT DOCUMENTS

| | | | |
|---|---|---|---|
| 2,640,717 | 6/1953 | Scheuring | 285/411 |
| 3,600,770 | 8/1971 | Halling | 285/411 |
| 3,661,409 | 5/1972 | Brown et al. | 285/367 |
| 4,781,406 | 11/1988 | Hübener | 285/411 |

FOREIGN PATENT DOCUMENTS

| | | |
|---|---|---|
| 0027406 | 4/1981 | European Pat. Off. . |
| 1164320 | 10/1958 | France ................ 285/411 |
| 3048903 | 7/1982 | Germany . |
| 3932794 | 4/1991 | Germany . |
| 402490 | 12/1933 | United Kingdom ......... 285/367 |
| 663646 | 12/1951 | United Kingdom . |
| 1472750 | 5/1977 | United Kingdom ......... 285/367 |
| 2084235 | 4/1982 | United Kingdom . |

*Primary Examiner*—Eric K. Nicholson
*Attorney, Agent, or Firm*—Young & Thompson

[57] ABSTRACT

A device for forcing two conical flanges (1, 2) of a pipe coupling together under pressure with a seal (3, 4) between them, comprises a clamping chain with several straps (23) joined together by hinges (10). Thrust pieces (9) each have two flanks for contacting the two conical flanges (1, 2). Each thrust piece (9) is pivotably supported on a respective one of the chain hinges (10) and has on each of its two flanks two spaced supporting zones (16) for contacting the two flanges (I). The position of the thrust piece (9) is thus precisely determined by the support on the chain hinge (10) and the contact with the flanges (I) by the two supporting zones (16). The thrust piece (9) need not transmit any tensile forces in the clamping chain, and it can be small and lightweight.

8 Claims, 3 Drawing Sheets

DEVICE FOR FORCING TWO CONICAL FLANGES OF A PIPE COUPLING TOGETHER UNDER PRESSURE

The invention relates to an device for forcing two conical flanges of a pipe coupling together under pressure, a seal being arranged between these flanges, with a clamping chain having several straps joined together by way of hinges, and with thrust pieces each exhibiting two flanks for contacting the conical flanges.

Such devices wherein the conical flanges are encompassed by a clamping chain and, by tightening this chain with the use of a suitable lock adapted for rapid opening and closing, can be axially pressed against each other are known in various designs. The devices can ensure a tight coupling suitable, depending on the layout, also for metal gaskets or also capable of withstanding high excess pressures.

The clamping chains of the conventional devices, however, all have considerable disadvantages.

For example, there are clamping chains in the form of roller chains wherein the conically shaped flanks of the rollers extend over the flanges, and the rollers proper are rotatably supported on the hinge pins of a chain formed by intermediate straps. Contacting of the rollers with the flanges can, in each case, occur only at one point and is at most linear since respectively two oppositely oriented radii meet each other, in a similar manner as with the rollers of an antifriction bearing on the inner race. As a consequence, very high surface pressures arise which can be absorbed without damage practically only by hardened components. However, precisely this feature in many instances cannot be provided or is undesirable and expensive. Besides, such rollers contain the basic drawback that the outer diameter of the clamping chain becomes very large because the same radius required toward the inside for the contact of the roller flanks with the flanges is also present outside of the axis of rotation although the roller flanks, at that location, do not have to fulfill a function. This feature only increases the volume and the mass of such an arrangement.

There are furthermore tightening chains wherein the thrust pieces equipped with conical flanks each have two bores wherein, by two pins, by way of corresponding intermediate straps, the connection is established with the neighboring thrust pieces. In this structure, the surface pressure has already been substantially reduced since the flanks of such thrust pieces can be straight (for example made of drawn aluminum profile sections) or can even exhibit a curvature in the same direction as the flanges (which is impossible, in principle, with a roller). Also, here the part of the thrust pieces lying outside of the hinge pins and bores can be omitted since such part is unnecessary from functional as well as manufacturing viewpoints. Yet, such chains also still exhibit substantial disadvantages, since, per thrust piece, two pins are required, and the thrust pieces proper are exposed to a high tensile stress which is absolutely undesirable, for example, in case of thrust pieces of a synthetic resin. On account of the use of two pins, a large amount of material is furthermore necessary at the two ends of the thrust pieces although contact with the flanges takes place only in the center. Besides, such components also become heavy and expensive; this results in considerable drawbacks especially in case of relatively large nominal widths and parts of steel. In addition, the force transfer to the flanges is not entirely stable inasmuch as the thrust pieces can assume varying angular positions within a certain region. There are also conically bored hollow shells or segments engaging along a major portion of the periphery of the flanges and being pulled toward each other by means of screws. However, these hollow shells or segments have only a single theoretically correct position with respect to the flange axis, but this position is hardly attained during tightening since the extent to which the gasket is pressed together between the flanges cannot be accurately predetermined. This holds true, in particular, for metal gaskets without a solid stop in the axial direction.

It is an object of this invention to avoid all of these disadvantages and to provide a device of the type discussed hereinabove which is lightweight and inexpensive and yet accomplishes all required functions with a minimum of material and with maximum safety.

The device according to this invention, attaining this object, is characterized in that each thrust piece is pivotably supported in respectively one of the chain hinges and exhibits on its two flanks respectively two mutually separated bearing zones for contact with the two flanges.

The device of this invention combines the advantages of the roller chain with those of the thrust pieces with two pins, and at the same time avoids the drawbacks thereof. Besides, the parts can be designed to be at an optimum regarding their strength (material needs to be present only where the actual function makes it necessary). At the same time, only 50% of the hinge pins previously required need to be provided; in addition, by direct force transfer from strap to strap, the tensile stress on the thrust pieces is eliminated and, precisely due to this feature, also a "safety framework" is placed around the thrust pieces which, in turn, is very advantageous especially in case of plastic parts. Also, force transmission to the flanges is entirely stable. Each of the thrust pieces can only assume a single, exactly defined position since it is held in three points, namely in the chain hinge and at the two supporting zones of the flanks.

On account of the special structure of the thrust pieces, the flanges are exposed to a more uniform stress, which also simplifies their design. With modest expenditure, relatively many pressure points are produced on the flange periphery, rendering the force distribution extremely uniform especially in highly stressed couplings.

Figure 2:
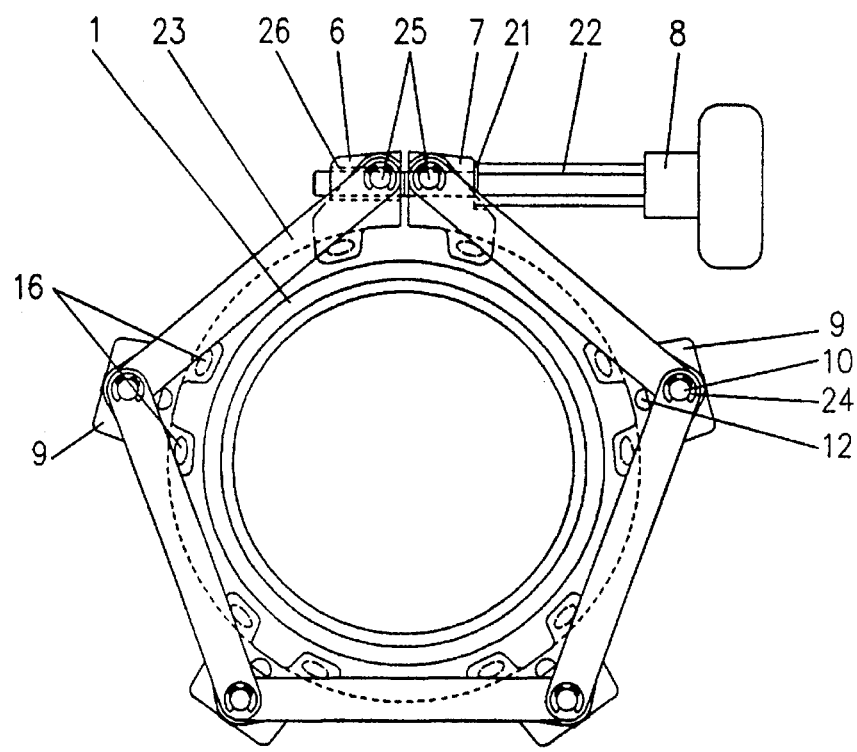
Figure 3:
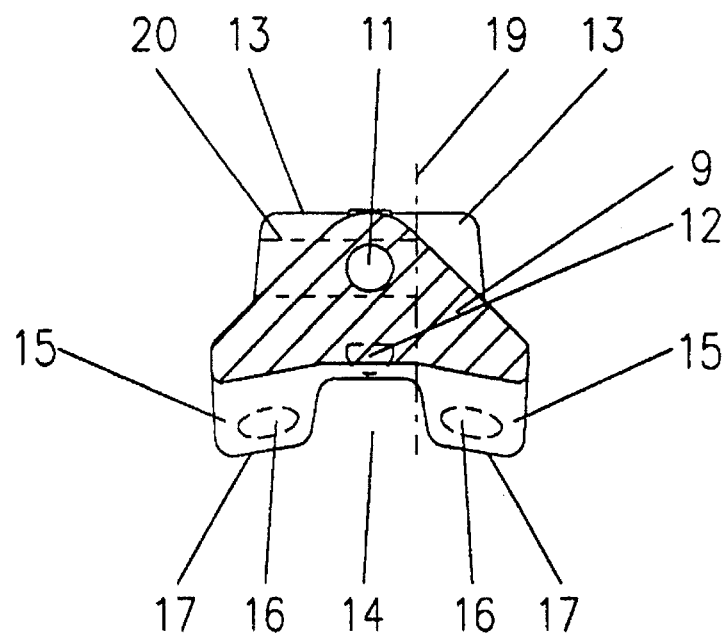
Figure 4:
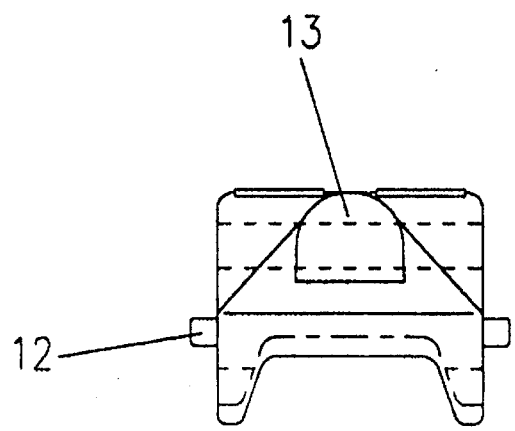
Figure 5:
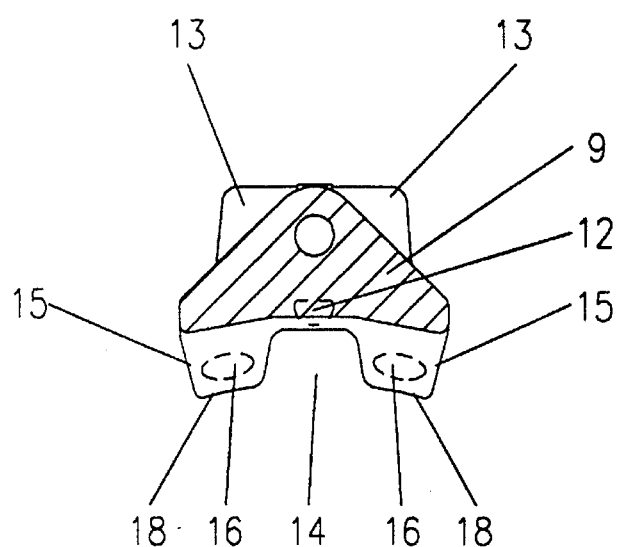
Figure 6:
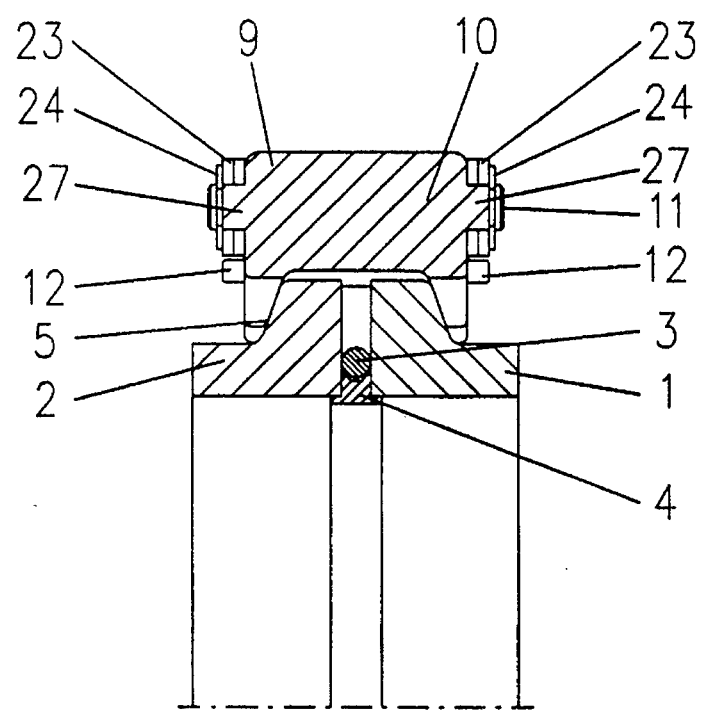

Embodiments of the invention will be described in greater detail below with reference to the drawings wherein:

FIG. 1 shows an axial section through a thrust piece of a device according to this invention along with flanges and seal of a pipe coupling, FIG. 2 shows an end view of such a device on a reduced scale, FIG. 3 is a cross section through an individual thrust piece, FIG. 4 is a lateral view of the thrust piece of FIG. 3, FIG. 5 shows, in a sectional view similar to that of FIG. 3, a thrust piece of a somewhat different structure, and FIG. 6 shows a further version in a view similar to that of FIG. 1.

FIG. 1 shows two conical flanges 1 and 2, a seal 3 being arranged between them. The seal 3 is seated on a sealing ring 4 which latter also serves for the mutual centering of flanges 1 and 2. A thrust piece 9 rests on the conical lateral surfaces 5 of the two flanges 1 and 2, this thrust piece being pivotably supported in a chain hinge 11. The chain hinge 11 is constituted, in this embodiment, by a pin 10. Furthermore, straps 23 are supported on the pin 10, joining neighboring chain hinges with one another. The straps 23 are located at the thrust piece 9 on the outside and secured by lock washers 24. The thrust piece 9 furthermore exhibits one or two lug-shaped extensions 12 along its outer sides, these extensions running in the direction of the width of the thrust piece 9 into the zone of the straps 23 and limiting, in cooperation with the straps 23, the pivotability of the thrust piece 9 with respect to the straps 23.

FIG. 2 illustrates all of the parts of a device according to this invention in an end view, and it can be seen how the thrust pieces 9 are arranged in a tightening chain formed by the straps 23 and chain hinge pins 10. Each of the two flanks of each thrust piece 9 is in contact with the respective flange in each case in two mutually separated bearing zones 16, and introduction of force into the thrust piece takes place only at one location, namely by way of the hinge pin 10. The thrust piece 9 is pivotably supported on the pin 10, but it can twist, in the non-tensioned condition of the clamping chain, only to such an extent as permitted by the lug-shaped extensions 12 in abutment with the straps 23. The clamping chain is mounted and tightened by a screw 22 with a handle 8 and two end pieces 6 and 7. The end pieces 6 and 7 are pivotably joined with a free end of respectively one strap 23 via a pin 25. The screw 22 is guided in the end piece 7 while the end piece 6 has an internal thread 26 engaged by the screw 22. The end face of a thickened section of the shank of the screw 22 is in contact, by way of a shim 21, with a lateral surface of the end piece 7. In this way, the two end pieces 6 and 7 are retained in an adjustable distance from each other. Each of the two end pieces 6 and 7 has respectively two flanks with respectively one supporting zone for contacting the two flanges.

On each flank of each thrust piece 9, each supporting zone 16 is fashioned so that it does not exactly fit the corresponding flange configuration but rather has a larger radius of curvature than the flanges at the contact points of the thrust piece. If the radius of curvature of the supporting zone were to be of the same size as the flange radius at the provided contact points, then there would be the danger that the supporting zone, at the beginning of the locking step, is forced against the flange with respectively one sharp edge only at the two ends of the supporting zone, thus damaging this flange. In the extreme case, the radius of curvature of the supporting zone, with less highly stressed couplings, can also be infinite, i.e. the supporting zone 16 can be planar. In case of higher stresses, or in case a lower surface pressure is desired, each supporting zone is curved in concave fashion, but, as mentioned above, with a radius of curvature larger than the radius of the flanges at the contact points of the thrust piece.

FIG. 3 reveals additional details of the thrust piece 9, especially the two supporting zones 16 on the flank of the thrust piece. The supporting zones 16, in this case planar, lie on inner surfaces 15 of the thrust piece flank between which the flank has a recess 14. Also the inner boundaries 17 of the inner surfaces 15 here extend tangentially with respect to the flange. The thrust piece 9 exhibits, approximately in the center of its width, eye-shaped reinforcements 13 extending in the peripheral direction of the clamping chain; see also FIG. 4.

The design of the end piece 6 or 7 (FIG. 2) is indicated by means of a line 19 in FIG. 3. The end piece corresponds to a portion of the thrust piece 9, in FIG. 3 to the left of line 19, with an additionally provided bore 20 (guide bore in the end piece 7 and/or threaded bore in the end piece 6).

In the thrust piece illustrated in FIG. 5, the bearing zones 16 have the same curvature as the outsides of the flanges, but with a radius of curvature larger than the radius of the flanges at the supporting points of the thrust piece. The bearing zones 16 lie on inner surfaces 15 of the thrust piece flank, the inner boundaries 18 of which are here likewise curved in concave fashion (rather than extending tangentially to the flange as the boundaries 17 in FIG. 3). Thereby, the contact pressure on the flanges can be still further reduced.

FIG. 6, in a view similar to that of FIG. 1, shows a thrust piece 9 along with flanges 1 and 2 and seals 3 and 4. In this version, the hinge pins 10 have been omitted. Instead, the chain hinges 11 are constituted by lugs 27 projecting away from the thrust piece 9 at the end faces thereof; these lugs can be fashioned to be integral with the thrust piece 9. The straps 23 of the clamping chain are pivotably supported on the lugs 27.

What is claimed is:

1. Device for forcing two conical flanges (1, 2) of a pipe coupling together under pressure with a seal (3, 4) between said flanges, said device comprising a clamping chain having a plurality of straps (23) directly joined together via hinges (11), and having overlapping ends at said hinges, and thrust pieces (9) each having two flanks for contacting the conical figures (1, 2), each thrust piece (9) being pivotably supported on only one chain hinge (11) and having on each of said two flanks two mutually spaced supporting zones (16) for contact with each of the two flanges (1, 2).

2. Device according to claim 1, there being a said thrust piece (9) on each of the chain hinges (11).

3. Device according to claim 1, further comprising at least two end pieces (6, 7) connected with a free end of respectively one strap (23), each of said end pieces having two flanks with respectively one supporting zone (16) for contacting the two flanges (I, 2) and being maintained at an adjustable distance from each other.

4. Device according to claim 3, wherein said pieces (6, 7) are held at an adjustable distance from each other by a screw (22) extending through bores in the end pieces.

5. Device according to claim 1, wherein each thrust piece (9) has approximately in the center of its width, eye-shaped reinforcements (13) extending in the peripheral direction of the clamping chain.

6. Device according to claim 1, wherein each thrust piece (9) has respectively at least one extension (12) projecting in the direction of the width of the thrust piece, said extension limiting the pivotability of the thrust piece (9) with respect to the straps (23).

7. Device according to claim 1, wherein each thrust piece (9) has in each of its flanks one recess (14) between the two supporting zones (16).

8. Device according to claim 1, in combination and in contact with two said conical pipe flanges, and wherein, on each flank of each thrust piece (9), each of the two supporting zones (16) is in each case formed by a surface curved in the same direction as the respective flange, the radius of curvature of this surface being larger than the radius of the flange at the contact point of the thrust piece.

* * * * *